United States Patent
Wu et al.

(10) Patent No.: US 11,452,138 B2
(45) Date of Patent: Sep. 20, 2022

(54) RANDOM ACCESS METHOD, USER EQUIPMENT, SOURCE BASE STATION AND TARGET BASE STATION

(71) Applicant: VIVO MOBILE COMMUNICATION CO., LTD., Guangdong (CN)

(72) Inventors: Yumin Wu, Chang'an Dongguan (CN); Ran Yue, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 18 days.

(21) Appl. No.: 16/612,486

(22) PCT Filed: May 3, 2018

(86) PCT No.: PCT/CN2018/085453
§ 371 (c)(1),
(2) Date: Nov. 11, 2019

(87) PCT Pub. No.: WO2018/210134
PCT Pub. Date: Nov. 22, 2018

(65) Prior Publication Data
US 2021/0007144 A1    Jan. 7, 2021

(30) Foreign Application Priority Data
May 16, 2017   (CN) .......................... 201710344565.5

(51) Int. Cl.
*H04W 72/04*   (2009.01)
*H04W 74/00*   (2009.01)
(Continued)

(52) U.S. Cl.
CPC ....... *H04W 74/0833* (2013.01); *H04W 16/28* (2013.01); *H04W 36/0016* (2013.01); *H04W 72/046* (2013.01); *H04W 74/006* (2013.01)

(58) Field of Classification Search
CPC ............. H04W 74/0833; H04W 16/28; H04W 36/0016; H04W 72/046; H04W 74/006; H04W 74/08
See application file for complete search history.

(56) References Cited

U.S. PATENT DOCUMENTS 10,136,379 B2   11/2018   Liu et al.
10,477,591 B2 *  11/2019   Jung ................. H04W 74/0833
(Continued)

FOREIGN PATENT DOCUMENTS

CN    1596020 A    3/2005
CN    101114868 A   1/2008
(Continued)

OTHER PUBLICATIONS

CN Office Action Application No. 201710344565.5 dated Nov. 18, 2019.
(Continued)

*Primary Examiner* — Un C Cho
*Assistant Examiner* — Lalita W Pace
(74) *Attorney, Agent, or Firm* — Maschoff Brennan

(57) ABSTRACT

A random access method, a UE, a source base station and a target base station are provided. The random access method includes: the UE selects one or more beams after receiving random access resource configurations corresponding to a plurality of beams transmitted from a network side; and the UE selects a random access resource whose transmission time is a designated transmission time from available random access resources in accordance with the random access resource configuration corresponding to the one or more beams, to transmit a random access request.

20 Claims, 11 Drawing Sheets

(51) Int. Cl.
  *H04W 74/08* (2009.01)
  *H04W 16/28* (2009.01)
  *H04W 36/00* (2009.01)

(56) References Cited

U.S. PATENT DOCUMENTS

| | | |
|---|---|---|
| 2012/0082099 A1 | 4/2012 | Bienas et al. |
| 2016/0157267 A1 | 6/2016 | Frenne et al. |
| 2017/0325267 A1 | 11/2017 | Zhu et al. |
| 2017/0332407 A1* | 11/2017 | Islam .................. H04W 52/242 |
| 2017/0367030 A1 | 12/2017 | Liu et al. |
| 2018/0242300 A1* | 8/2018 | Hakola ................. H04B 7/086 |
| 2019/0104549 A1* | 4/2019 | Deng ................... H04B 7/0617 |
| 2019/0364439 A1* | 11/2019 | Lee ....................... H04B 7/088 |
| 2020/0205202 A1* | 6/2020 | Takahashi ............ H04W 74/002 |
| 2020/0296765 A1* | 9/2020 | Kim .................. H04W 74/0833 |
| 2020/0389925 A1* | 12/2020 | Lee ....................... H04W 48/20 |

FOREIGN PATENT DOCUMENTS

| | | |
|---|---|---|
| CN | 101296486 A | 10/2008 |
| CN | 101370267 A | 2/2009 |
| CN | 101932106 A | 12/2010 |
| CN | 102238665 A | 11/2011 |
| CN | 102291845 A | 12/2011 |
| CN | 102917469 A | 2/2013 |
| CN | 105744591 A | 7/2016 |
| CN | 106031287 A | 10/2016 |
| WO | 2016/086144 A1 | 6/2016 |

OTHER PUBLICATIONS

CN Search Report in Application No. 201710344565.5 dated Apr. 25, 2019.
International Search Report and Written Opinion in Application No. PCT/CN2018/085453 dated Nov. 28, 2019.
CN Office Action in Application No. 201710344565.5 dated Mar. 23, 2020.
EP Search Report in Application No. 18802426.9 dated May 25, 2020.
"Discussion on RAACH Procedure" 3GPP TSG RAN WG1 NR ad hoc Meeting, Jan. 16, 2017.
"RACH procedure for multi-Tx beam operatoin" 3GPP TSG RAN WG1 NR Ad-Hoc Meeting, Jan. 16, 2017.

* cited by examiner

RANDOM ACCESS METHOD, USER EQUIPMENT, SOURCE BASE STATION AND TARGET BASE STATION

CROSS-REFERENCE TO RELATED APPLICATION

The present application is the U.S. national phase of PCT Application No.PCT/CN2018/085453 filed on May 3, 2018, which claims a priority of the Chinese patent application No.201710344565.5 filed in China on May 16, 2017, which is incorporated herein by reference in its entirety.

TECHNICAL FIELD

The present disclosure relates to the field of communication technology, in particular to a random access method, a User Equipment (UE), a source base station and a target base station.

BACKGROUND

In the related art, a beam-related random access process includes the following steps. Step 1: a network side issues information of a plurality of random access resource configurations corresponding to a plurality of different beams. Step 2: a UE selects a detected beam with best signal quality, and transmits a random access request in accordance with the information of the random access resource configuration corresponding to the beam.

During a handover or state transition process of the UE, when the UE is merely capable of initiating the random access process in accordance with the beam with the best signal quality, it takes a certain time period for the UE to detect the beam with the best signal quality, so a time for initiating the random access process by the UE may be delayed. Hence, a time period for the handover or state transition process may increase, resulting in a larger data transmission interruption time period.

SUMMARY

An object of the present disclosure is to provide a random access method, a UE, a source base station and a target base station, so as to prevent the time for initiating the random access process by the UE from being delayed.

In a first aspect, the present disclosure provides in some embodiments a random access method for a UE, including: selecting one or more beams after receiving random access resource configurations corresponding to a plurality of beams transmitted from a network side; and selecting a random access resource whose transmission time is a designated transmission time from available random access resources in accordance with the random access resource configuration corresponding to the one or more beams, to transmit a random access request.

In a second aspect, the present disclosure provides in some embodiments a random access method for a UE, including: selecting a firstly detected first beam; selecting a first random access resource with an earliest transmission time from available random access resources in accordance with a random access resource configuration corresponding to the firstly detected first beam, to prepare to transmit the random access request; or randomly selecting an available first random access resource from a plurality of available random access resources within a third predetermined time period in accordance with the random access resource configuration corresponding to the firstly detected first beam, to prepare to transmit the random access request, the third predetermined time period being a time period determined in accordance with a time for a random access resource with an earliest transmission time; selecting a second beam detected before transmitting a random access request; selecting a second random access resource with an earliest transmission time from all of the available random access resources in accordance with the random access resource configurations corresponding respectively to the first beam and the second beam; or randomly selecting an available second random access resource from all of the available random access resources within a fourth predetermined time period in accordance with the random access resource configurations corresponding respectively to the first beam and the second beam, the fourth predetermined time period being a time period determined in accordance with the time for the random access resource with the earliest transmission time; when the second random access resource is different from the first random access resource, transmitting the random access request through the second random access resource; and when the second random access resource is the first random access resource, transmitting the random access request through the second random access resource or the first random access resource.

In a third aspect, the present disclosure provides in some embodiments a random access method for a target base station, including: determining time information for controlling a UE to execute a handover process; and transmitting the time information for controlling the UE to execute the handover process to a source base station, so that the source base station controls the UE to execute a random access process in the handover process in accordance with the time information for controlling the UE to execute the handover process.

In a fourth aspect, the present disclosure provides in some embodiments a random access method for a source base station, including: receiving time information for controlling a UE to execute a handover process; and controlling the UE to execute a random access process in the handover process in accordance with the time information for controlling the UE to execute the handover process.

In a fifth aspect, the present disclosure provides in some embodiments a random access method for a UE, including: receiving information of a time for executing a handover process; and executing a random access process in a handover process in accordance with the information of a time for executing the handover process.

In a sixth aspect, the present disclosure provides in some embodiments a UE, including: a first selection module configured to select one or more beams after receiving random access resource configurations corresponding to a plurality of beams transmitted from a network side; and a second selection module configured to select a random access resource whose transmission time is a designated transmission time from available random access resources in accordance with the random access resource configuration corresponding to the one or more beams, to transmit a random access request.

In a seventh aspect, the present disclosure provides in some embodiments a UE, including: a third selection module configured to select a firstly detected first beam; a fourth selection module configured to select a first random access resource with an earliest transmission time from available random access resources in accordance with a random access resource configuration corresponding to the firstly detected first beam, to prepare to transmit the random access request; or randomly select an available first random access resource from a plurality of available random access resources within a third predetermined time period in accordance with the random access resource configuration corresponding to the firstly detected first beam, to prepare to transmit the random access request, the third predetermined time period being a time period determined in accordance with a time for a random access resource with an earliest transmission time; a fifth selection module configured to select a second beam detected before transmitting a random access request; a sixth selection module configured to select a second random access resource with an earliest transmission time from all of the available random access resources in accordance with the random access resource configurations corresponding respectively to the first beam and the second beam, or randomly select an available second random access resource from all of the available random access resources within a fourth predetermined time period in accordance with the random access resource configurations corresponding respectively to the first beam and the second beam, the fourth predetermined time period being a time period determined in accordance with the time for the random access resource with the earliest transmission time; a first transmission module configured to, when the second random access resource is different from the first random access resource, transmit the random access request through the second random access resource; and a second transmission module configured to, when the second random access resource is the first random access resource, transmit the random access request through the second random access resource or the first random access resource.

In an eighth aspect, the present disclosure provides in some embodiments a target base station, including: a first determination module configured to determine time information for controlling a UE to execute a handover process; and a third transmission module configured to transmit the time information for controlling the UE to execute the handover process to a source base station, so that the source base station controls the UE to execute a random access process in the handover process in accordance with the time information for controlling the UE to execute the handover process.

In an ninth aspect, the present disclosure provides in some embodiments a source base station, including: a first reception module configured to receive time information for controlling a UE to execute a handover process; and a control module configured to control the UE to execute a random access process in the handover process in accordance with the time information for controlling the UE to execute the handover process.

In a tenth aspect, the present disclosure provides in some embodiments a UE, including: a second reception module configured to receive information of a time for executing a handover process; and a handover execution module configured to execute a random access process in the handover process in accordance with the information of the time for executing the handover process.

In an eleventh aspect, the present disclosure provides in some embodiments a UE, including a memory, a processor, and a computer program stored in the memory and executed by the processor. The processor is configured to execute the computer program so as to implement the above-mentioned random access method in the first aspect, the second aspect, or the fifth aspect.

In a twelfth aspect, the present disclosure provides in some embodiments a network side device, including a memory, a processor, and a computer program stored in the memory and executed by the processor. The processor is configured to execute the computer program so as to implement the above-mentioned random access method in the third aspect or the fourth aspect.

In a thirteenth aspect, the present disclosure provides in some embodiments a computer-readable storage medium storing therein a computer program. The computer program is executed by a processor, so as to implement the above-mentioned random access method in the first aspect, the second aspect, the third aspect, the fourth aspect, or the fifth aspect.

According to the random access method, the UE, the source base station and the target base station in the embodiments of the present disclosure, it is able to prevent the time for initiating the random access process by the UE from being delayed, thereby to enable the UE to initiate the random access process as soon as possible, reduce the time delay for the handover or state transition process, and improve the communication performance.

BRIEF DESCRIPTION OF THE DRAWINGS

Other advantages and benefits of the present disclosure may become apparent to a person skilled in the art through reading the description in the preferred embodiments of the present disclosure. The following drawings are merely provided for illustrative purposes, but shall not be construed as limiting the present disclosure. A same reference sign may represent a same member in the drawings. In these drawings.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Such terms as "include" or "including" or any other variations involved in the present disclosure intend to provide an non-exclusive coverage; for example, a procedure, method, system, article or device including a series of steps or units may also include any other steps or units not listed herein, or may also include any inherent steps or units of the procedure, method, article or device.

Figure 1:
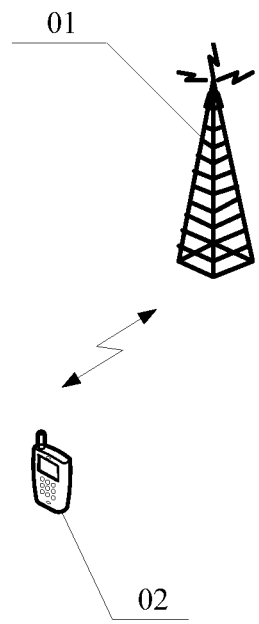
FIG. 1 is a schematic view showing a system architecture for a random access method according to the present disclosure.

The present disclosure provides a system architecture for a random access method which, as shown in FIG. 1, includes a network side device 01 and a UE 02.

The network side device 01 may be a Base Transceiver Station (BTS) of a Global System of Mobile Communication (GSM) system or a Code Division Multiple Access (CDMA) system, or a Node B (NB) of a Wideband Code Division Multiple Access (WCDMA) system, or an evolutional Node B (eNB or eNodeB) of a Long Term Evolution (LTE) system, or a base station or a relay or access point of a New Radio Access Technology (New RAT or NR) system, or a base station in a future 5th-Generation (5G) network, which will not be particularly defined herein.

The UE 02 may be a wireless terminal or a wired terminal. The wireless terminal may refer to a device capable of providing voice services and/or the other services to a user, a handheld device having a wireless connection function, or another processing device capable of being connected to a wireless modem. The wireless UE may communicate with one or more core networks via a Radio Access Network (RAN). It may be a mobile terminal, e.g., a mobile phone (or cellular phone), or a computer having a mobile terminal, e.g., a portable, pocket-sized, handheld, computer built-in, or vehicle-mounted mobile device, which is capable of exchanging voice and/or data with the RAN. For example, the UE may be a Personal Communication Service (PCS) phone, a cordless phone, a Session Initiation Protocol (SIP) phone, a Wireless Local Loop (WLL) station, or a Personal Digital Assistant (PDA). The wireless terminal may also be called as system, subscriber unit, subscriber station, mobile station, mobile, remote station, remote terminal, access terminal, user terminal, user agent, user device, or user equipment, which will not be particularly defined herein.

Figure 2:
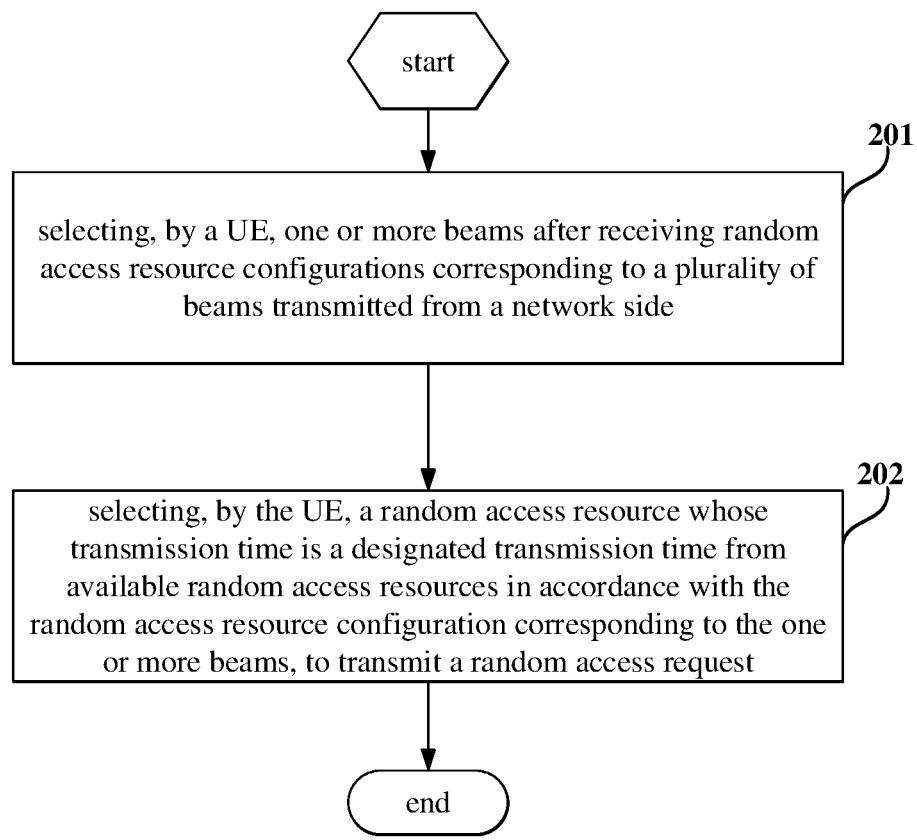
FIG. 2 is a flow chart of a random access method according to an embodiment of the present disclosure.

The present disclosure provides in an embodiment a random access method which, as shown in FIG. 2, includes:

Step 201 of selecting, by a UE, one or more beams after receiving random access resource configurations corresponding to a plurality of beams transmitted from a network side; and Step 202 of selecting, by the UE, a random access resource whose transmission time is a designated transmission time from available random access resources in accordance with the random access resource configuration corresponding to the one or more beams, to transmit a random access request.

In the embodiments of the present disclosure, the available random access resource may include a beam and/or a Physical Random Access Channel (PRACH) resource.

The random access resource whose transmission time is the designated transmission time may be, but not limited to, a random access resource with an earlier or earliest transmission time, or any available random access resource selected from a plurality of available random access resources within a time period determined in accordance with a time for the random access resource with the earliest transmission time.

In the embodiments of the present disclosure, the UE may select, on its own initiative, the random access resource with the earlier (or earliest) transmission time from the available random access resources to transmit the random access request. As a result, it is able to prevent the time for initiating the random access process by the UE from being delayed, thereby to enable the UE to initiate the random access process as soon as possible, and reduce the time delay for the handover or state transition process.

Figure 3:
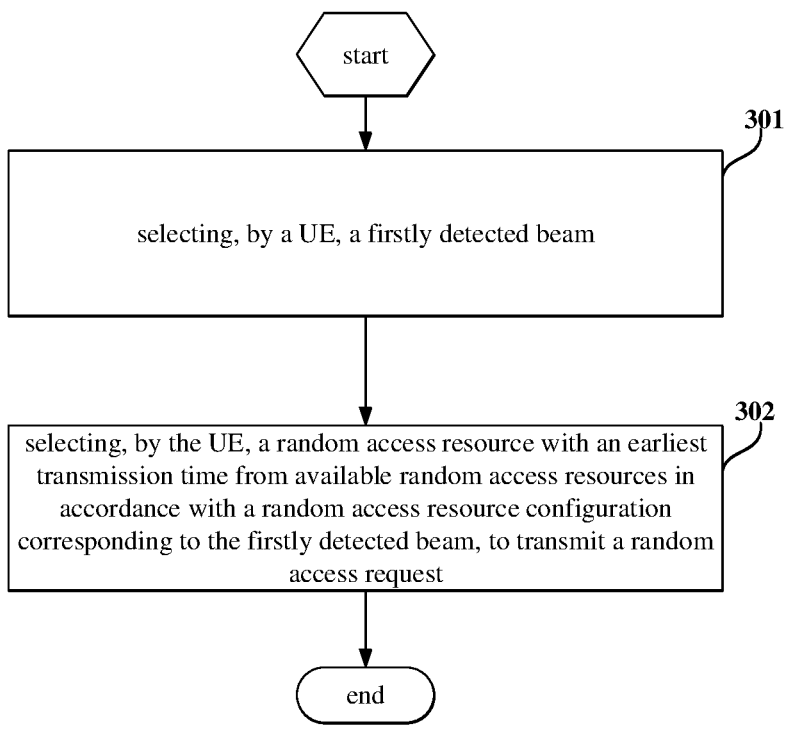
FIG. 3 is a flow chart of a random access method according to another embodiment of the present disclosure.

The present disclosure further provides in another embodiment a random access method which, as shown in FIG. 3, includes the following steps.

Step 301: selecting, by a UE, a firstly detected beam. The firstly detected beam may refer to a beam which has been detected by the UE at first, i.e., the beam detected earliest by the terminal.

Step 302: selecting, by the UE, a random access resource with an earliest transmission time from available random access resources in accordance with a random access resource configuration corresponding to the firstly detected beam, to transmit a random access request.

In the embodiments of the present disclosure, the UE may select, on its own initiative, the random access resource with the earliest transmission time from the available random access resources, and then transmit the random access request through the selected random access resource. As a result, it is able to prevent the time for initiating the random access process by the UE from being delayed, thereby to enable the UE to initiate the random access process as soon as possible, and reduce the time delay for the handover or state transition process. It should be appreciated that, the beam may be identified by, but not limited to, a Channel State Information-Reference Signal (CSI-RS), a Single Side Band (SSB), or a combination thereof.

Figure 4:
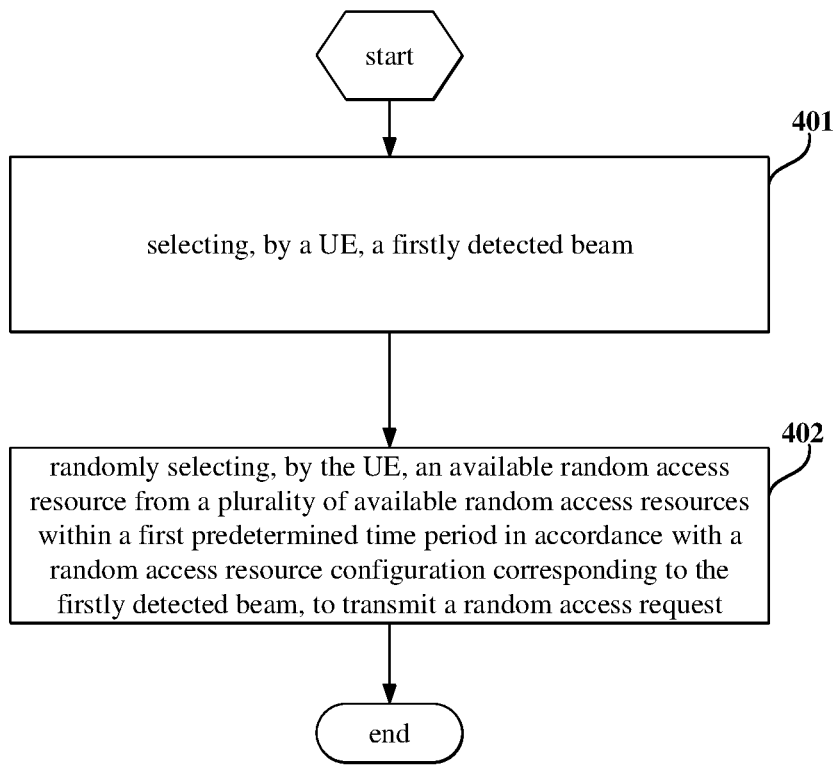
FIG. 4 is a flow chart of a random access method according to yet another embodiment of the present disclosure.

The present disclosure further provides in another embodiment a random access method which, as shown in FIG. 4, includes the following steps.

Step 401: selecting, by a UE, a firstly detected beam. The firstly detected beam may refer to a beam which has been detected by the UE at first, i.e., the beam detected earliest by the terminal.

Step 402: randomly selecting, by the UE, an available random access resource from a plurality of available random access resources within a first predetermined time period in accordance with a random access resource configuration corresponding to the firstly detected beam, to transmit a random access request.

The first predetermined time period may be a time period determined in accordance with a time for the random access resource with the earliest transmission time. For example, a time for transmitting a first one random access resource by the UE may be t1, and the plurality of available random access resources within the first predetermined time period may refer to the available random access resources within the time period of t1+T1, where a value of T1 may be agreed in a protocol, or configured by a network.

It should be appreciated that, in an embodiment of the present disclosure, a range of the first predetermined time period will not be particularly defined herein.

In the embodiments of the present disclosure, the UE may select, on its own initiative, the random access resource with the earliest transmission time from the available random access resources, and then transmit the random access request through the selected random access resource. As a result, it is able to prevent the time for initiating the random access process by the UE from being delayed, thereby to enable the UE to initiate the random access process as soon as possible, and reduce the time delay for the handover or state transition process.

Figure 5:
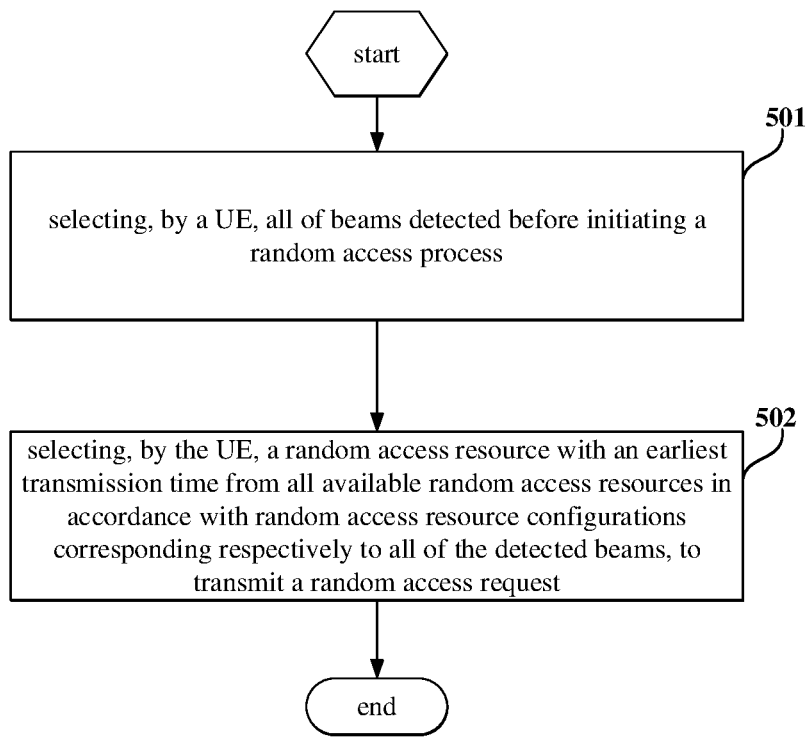
FIG. 5 is a flow chart of a random access method according to still yet another embodiment of the present disclosure.

The present disclosure further provides in another embodiment a random access method which, as shown in FIG. 5, includes the following steps.

Step 501: selecting, by a UE, all of beams detected before initiating a random access process. It should be appreciated that, the quantity of the beams will not be particularly defined in this embodiment.

Step 502: selecting, by the UE, a random access resource with an earliest transmission time from all available random access resources in accordance with random access resource configurations corresponding respectively to all of the detected beams, to transmit a random access request. The random access resource with the earliest transmission time may refer to a first random access resource capable of being transmitted.

In the embodiments of the present disclosure, the UE may select, on its own initiative, the random access resource with the earliest transmission time from the available random access resources, and then transmit the random access request through the selected random access resource. As a result, it is able to prevent the time for initiating the random access process by the UE from being delayed, thereby to enable the UE to initiate the random access process as soon as possible, and reduce the time delay for the handover or state transition process.

Figure 6:
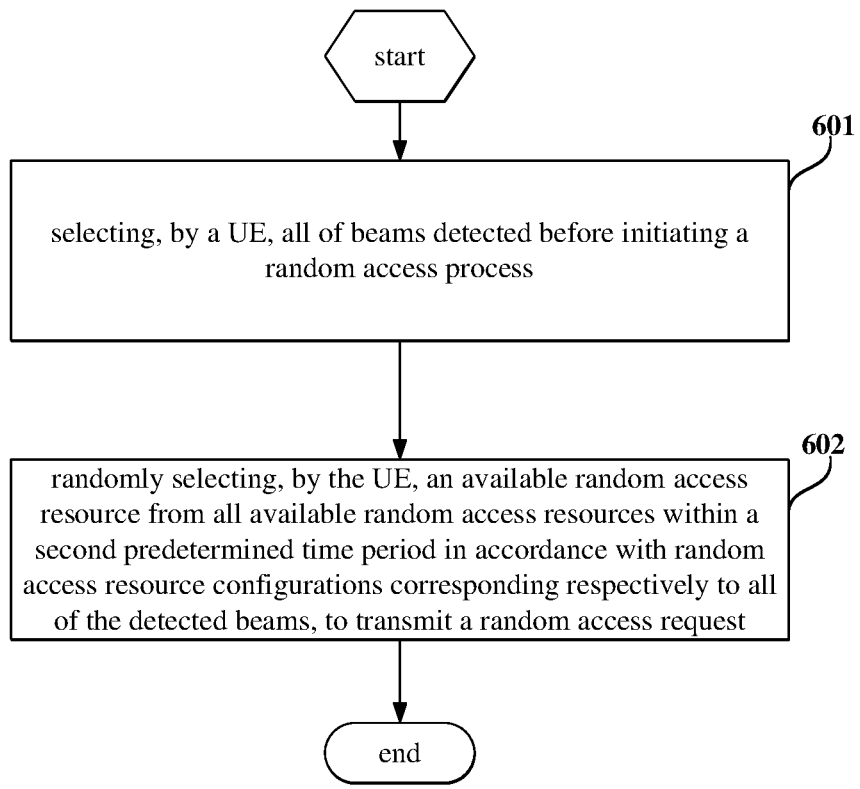
FIG. 6 is a flow chart of a random access method according to still yet another embodiment of the present disclosure.

The present disclosure further provides in another embodiment a random access method which, as shown in FIG. 6, includes the following steps.

Step 601: selecting, by a UE, all of beams detected before initiating a random access process. It should be appreciated that, the quantity of the beams will not be particularly defined herein.

Step 602: randomly selecting, by the UE, an available random access resource from all available random access resources within a second predetermined time period in accordance with random access resource configurations corresponding respectively to all of the detected beams, to transmit a random access request.

The second predetermined time period may be a time period determined in accordance with a time for a random access resource with an earliest transmission time. For example, a time for transmitting a first one random access resource by the UE may be t2, and the random access resources within the second predetermined time period may refer to the available random access resources within the time period of t2+T2, where a value of T2 may be agreed in a protocol, or configured by a network.

It should be appreciated that, a range of the second predetermined time period will not be particularly defined in this embodiment.

In the embodiments of the present disclosure, the UE may select, on its own initiative, the random access resource with the earliest transmission time from the available random access resources, and then transmit the random access request through the selected random access resource. As a result, it is able to prevent the time for initiating the random access process by the UE from being delayed, thereby to enable the UE to initiate the random access process as soon as possible, and reduce the time delay for the handover or state transition process.

Figure 7:
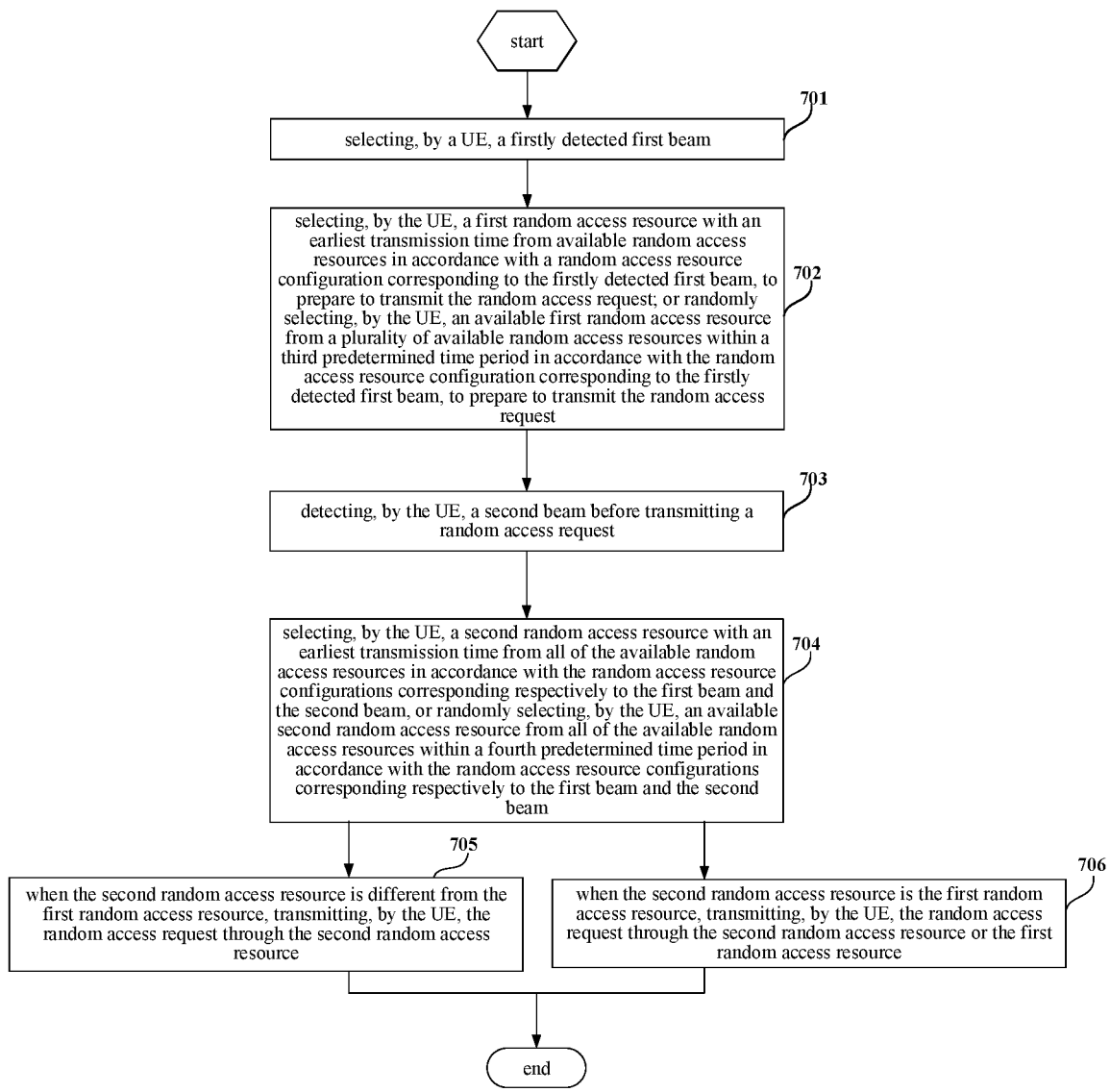
FIG. 7 is a flow chart of a random access method according to still yet another embodiment of the present disclosure.

The present disclosure further provides in another embodiment a random access method which, as shown in FIG. 7, includes the following steps.

Step 701: selecting, by a UE, a firstly detected first beam. When the UE selects the firstly detected first beam, it may be understood as that the UE selects a beam that is detected earliest.

Step 702: selecting, by the UE, a first random access resource with an earliest transmission time from available random access resources in accordance with a random access resource configuration corresponding to the firstly detected first beam, to prepare to transmit the random access request; or randomly selecting, by the UE, an available first random access resource from a plurality of available random access resources within a third predetermined time period in accordance with the random access resource configuration corresponding to the firstly detected first beam, to prepare to transmit the random access request. The third predetermined time period may be a time period determined in accordance with a time for a random access resource with an earliest transmission time.

For example, a time for transmitting a first one random access resource by the UE may be t3, and the random access resources within the third predetermined time period may refer to the available random access resources within the time period of t3+T3, where a value of T3 may be agreed in a protocol, or configured by a network.

It should be appreciated that, a range of the third predetermined time period will not be particularly defined in this embodiment.

Step 703: detecting, by the UE, a second beam before transmitting a random access request.

Step 704: selecting, by the UE, a second random access resource with an earliest transmission time from all of the available random access resources in accordance with the random access resource configurations corresponding respectively to the first beam and the second beam, or randomly selecting, by the UE, an available second random access resource from all of the available random access resources within a fourth predetermined time period in accordance with the random access resource configurations corresponding respectively to the first beam and the second beam. The fourth predetermined time period may be a time period determined in accordance with the time for the random access resource with the earliest transmission time.

For example, a time for transmitting a first one random access resource by the UE may be t4, and the random access resources within the fourth predetermined time period may refer to the available random access resources within the time period of t4+T4, where a value of T4 may be agreed in a protocol, or configured by a network.

It should be appreciated that, a range of the fourth predetermined time period will not be particularly defined in this embodiment.

Step 705: when the second random access resource is different from the first random access resource, transmitting, by the UE, the random access request through the second random access resource.

Step 706: when the second random access resource is the first random access resource, transmitting, by the UE, the random access request through the second random access resource or the first random access resource.

In the embodiments of the present disclosure, the UE may select, on its own initiative, the random access resource with the earliest transmission time from the available random access resources, and then transmit the random access request through the selected random access resource. As a result, it is able to prevent the time for initiating the random access process by the UE from being delayed, thereby to enable the UE to initiate the random access process as soon as possible, and reduce the time delay for the handover or state transition process.

Figure 8:
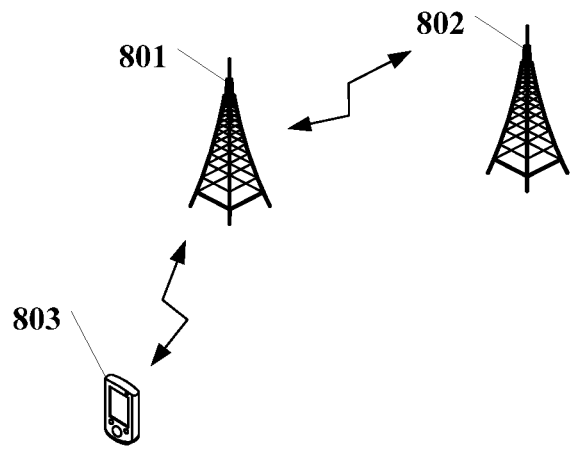
FIG. 8 is a schematic view showing another system architecture for the random access method according to the present disclosure.

The present disclosure further provides another system architecture for a random access method which, as shown in FIG. 8, includes a source base station 801, a target base station 802 and a UE 803.

The source base station 801 and the target base station 802 may each be a BTS of a GSM system or a CDMA system, or an NB of a WCDMA system, or an eNB of an LTE system, or a base station or a relay or access point of an NR system, or a base station in a future 5G network, which will not be particularly defined herein.

The UE 803 may be a wireless terminal or a wired terminal. The wireless terminal may refer to a device capable of providing voice services and/or the other services to a user, a handheld device having a wireless connection function, or another processing device capable of being connected to a wireless modem. The wireless terminal may communicate with one or more core networks via an RAN. It may be a mobile terminal, e.g., a mobile phone (or cellular phone), or a computer having a mobile terminal, e.g., a portable, pocket-sized, handheld, computer built-in, or vehicle-mounted mobile device, which is capable of exchanging voice and/or data with the RAN. For example, the UE may be a PCS phone, a cordless phone, an SIP phone, a WLL station, or a PDA. The wireless terminal may also be called as system, subscriber unit, subscriber station, mobile station, mobile, remote station, remote terminal, access terminal, user terminal, user agent, user device, or user equipment, which will not be particularly defined herein.

Figure 9:
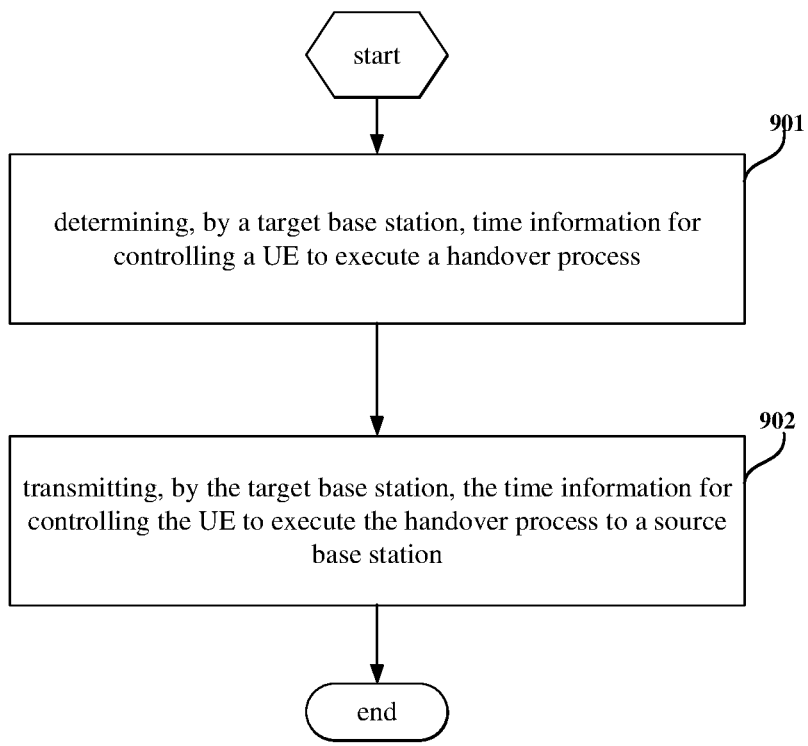
FIG. 9 is a flow chart of a random access method according to still yet another embodiment of the present disclosure.

The present disclosure further provides in another embodiment a random access method which, as shown in FIG. 9, includes the following steps.

Step 901: determining, by a target base station, time information for controlling a UE to execute a handover process.

In a possible embodiment of the present disclosure, the time information for controlling the UE to execute the handover process may include information of a time for issuing a handover command and/or information of a time for executing the handover process.

In the embodiments of the present disclosure, the target base station may determine a time for a random access resource capable of being firstly transmitted by the UE, including that the target base station determine a time for a beam resource and/or a PRACH resource capable of firstly transmitted by the UE.

The information of the time for executing the handover process may include a time determined by the target base station and configured for a beam resource and/or a PRACH resource capable of being firstly transmitted by the UE, or a difference between the time determined by the target base station and configured for the beam resource and/or the PRACH resource capable of being firstly transmitted by the UE and a configured first time offset.

For example, the time for the beam resource and/or the PRACH resource capable of being firstly transmitted by the UE may be t5. When it is necessary to control the UE to execute the handover process before t5, the time for the UE to execute the handover process may be a difference between the time for the beam resource and/or the PRACH resource capable of being firstly transmitted by the UE and the configured first time offset, i.e., the time for executing the handover process by the UE=t5-offset, where offset represents the configured first time offset. The first time offset may be agreed in a protocol or configured by a network.

The information of the time for issuing the handover command may include the time which is determined by the target base station and configured for the beam resource and/or the PRACH resource capable of being firstly transmitted by the UE, or a difference between the time which is determined by the target base station and configured for the beam resource and/or the PRACH resource capable of being firstly transmitted by the UE and a configured second time offset, i.e., the time for executing the handover process by the UE=t6-offset, where t6 represents the time for the beam resource and/or the PRACH resource capable of being firstly transmitted by the UE, and offset represents the configured first time offset. The second time offset may be agreed in a protocol or configured by a network.

Step 902: transmitting, by the target base station, the time information for controlling the UE to execute the handover process to a source base station, so that the source base station controls the UE to execute a random access process in the handover process in accordance with the time information for controlling the UE to execute the handover process.

In the embodiments of the present disclosure, the target base station may control the UE to select the random access resource with the earliest transmission time from the available random access resources, so as to transmit the random access request. As a result, it is able to prevent the time for initiating the random access process by the UE from being delayed, thereby to enable the UE to initiate the random access process as soon as possible, and reduce the time delay for the handover or state transition process.

Figure 10:
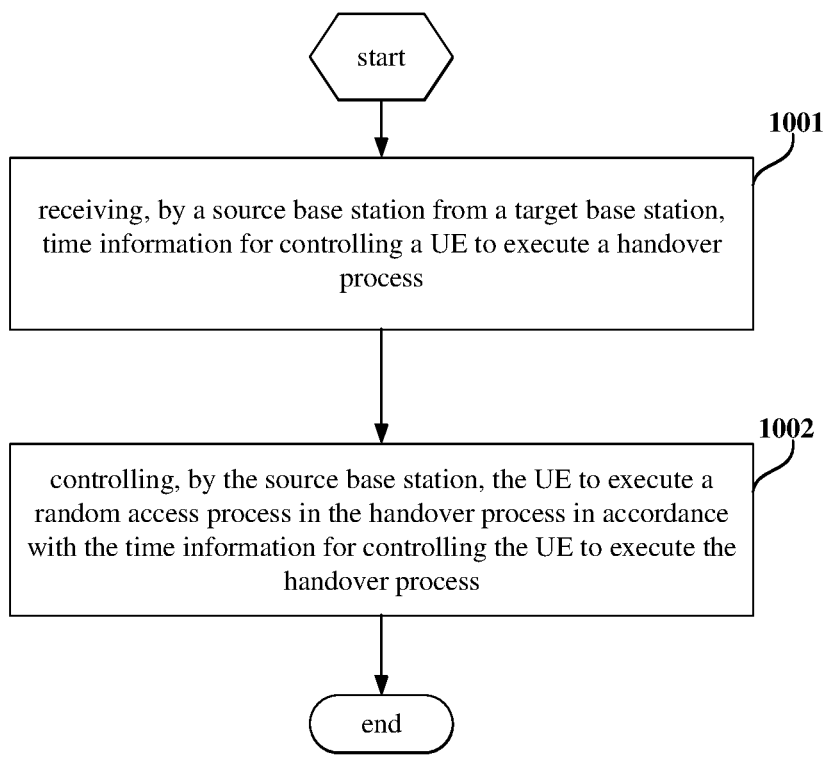
FIG. 10 is a flow chart of a random access method according to still yet another embodiment of the present disclosure.

The present disclosure further provides in some embodiments a random access method which, as shown in FIG. 10, includes: Step 1001 of receiving, by a source base station, time information for controlling a UE to execute a handover process; and Step 1002 of controlling, by the source base station, the UE to execute a random access process in the handover process in accordance with the time information for controlling the UE to execute the handover process.

In a possible embodiment of the present disclosure, the time information for controlling the UE to execute the handover process may include information of a time for issuing a handover command and/or information of a time for executing the handover process.

In a possible embodiment of the present disclosure, in Step 1002, the source base station may transmit the information of the time for executing the handover process to the UE so that the UE executes the random access process in the handover process in accordance with the information of the time for executing the handover, and/or the source base station may transmit the handover command to the UE at a time point indicated in the information of the time for issuing the handover command. To be specific, the source base station may transmit the handover command to the UE at a time point indicated in the information of the time for issuing the handover command, and the handover command may include the information of the time for executing the handover process, so that the UE executes the random access process in the handover process in accordance with the information of the time for executing the handover process.

In a possible embodiment of the present disclosure, the random access method may further include determining, by the source base station, that the UE executes the random access process in the handover process at the time indicated in the information of the time for handover the handover process.

The information of the time for executing the handover process may include the time which is determined by the target base station and configured for the beam resource and/or the PRACH resource capable of being firstly transmitted by the UE, or a difference between the time which is determined by the target base station and configured for the beam resource and/or the PRACH resource capable of being firstly transmitted by the UE and a configured first time offset.

The information of the time for issuing the handover command may include the time which is determined by the target base station and configured for the beam resource and/or the PRACH resource capable of being firstly transmitted by the UE, or a difference between the time which is determined by the target base station and configured for the beam resource and/or the PRACH resource capable of being firstly transmitted by the UE and a configured second time offset.

In the embodiments of the present disclosure, the target base station may control the UE to select the random access resource with the earliest transmission time from the available random access resources, so as to transmit the random access request. As a result, it is able to prevent the time for initiating the random access process by the UE from being delayed, thereby to enable the UE to initiate the random access process as soon as possible, and reduce the time delay for the handover or state transition process.

Figure 11:
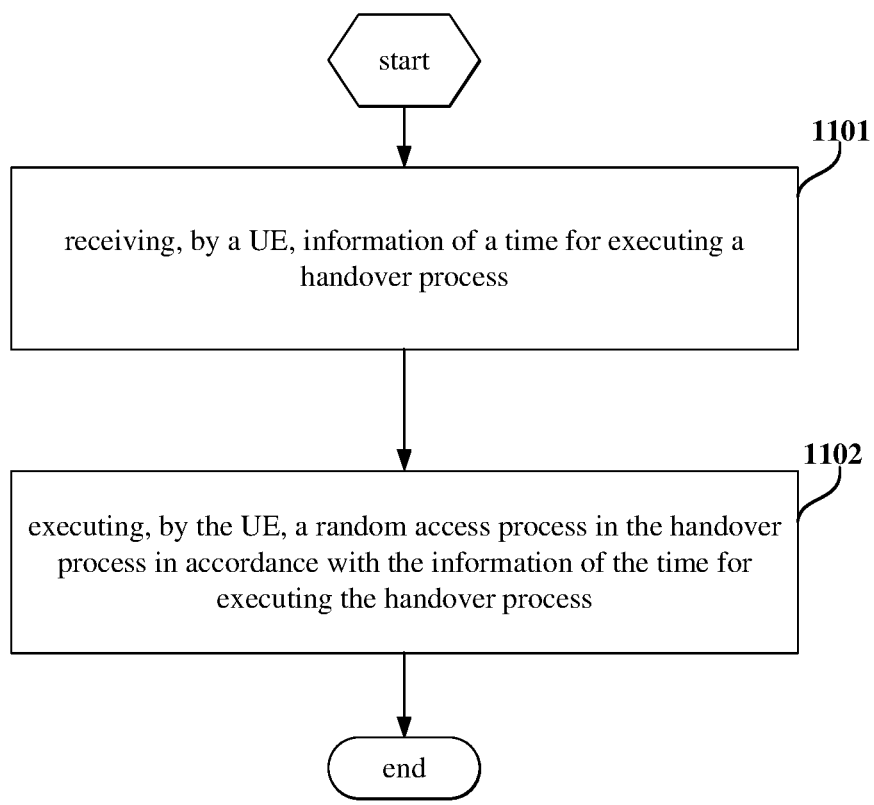
FIG. 11 is a flow chart of a random access method according to still yet another embodiment of the present disclosure.

The present disclosure provides in another embodiment a random access method which, as shown in FIG. 11, includes the following steps.

Step 1101: receiving, by a UE, information of a time for executing a handover process.

In the embodiment of the present disclosure, in Step 1101, optionally, the UE may receive a handover command transmitted by a source base station at a time point indicated in information of a time for issuing the handover command, and the handover command may include the information of the time for executing the handover process.

Step 1102: executing, by the UE, a random access process in the handover process in accordance with the information of the time for executing the handover process.

In the embodiment of the present disclosure, optionally, the information of the time for executing the handover process may include a time which is determined by the target base station and configured for a beam resource and/or a PRACH resource capable of being firstly transmitted by the UE, or a difference between the time which is determined by the target base station and configured for the beam resource and/or the PRACH resource capable of being firstly transmitted by the UE and a configured first time offset.

In the embodiments of the present disclosure, a target base station may control the UE to select a random access resource with an earliest transmission time from available random access resources, so as to transmit the random access request. As a result, it is able to prevent the time for initiating the random access process by the UE from being delayed, thereby to enable the UE to initiate the random access process as soon as possible, and reduce the time delay for the handover or state transition process.

Figure 12:
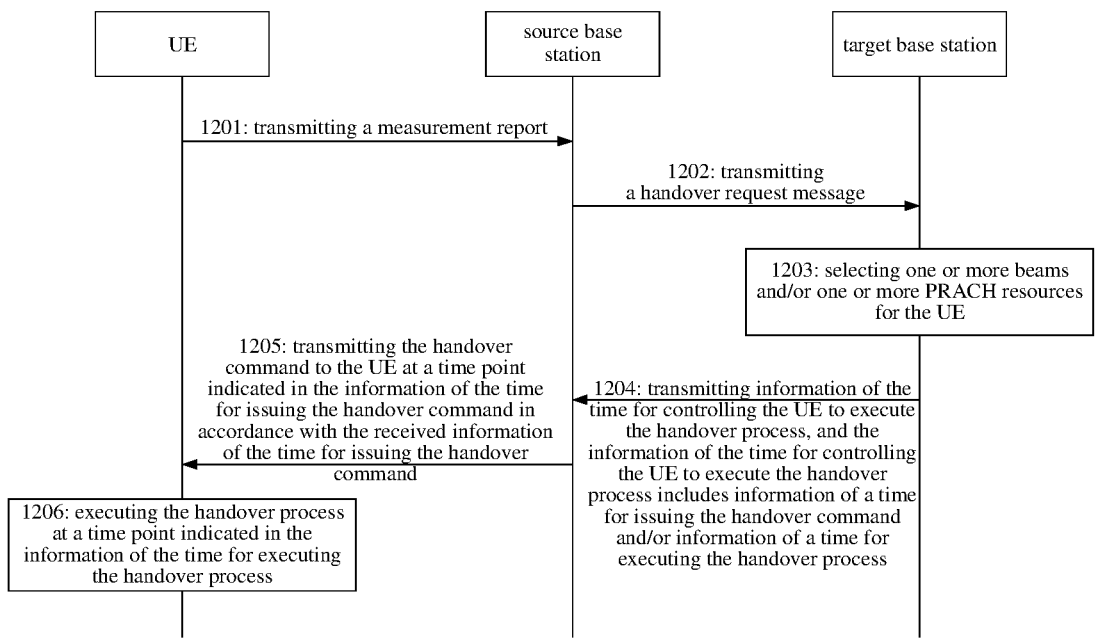
FIG. 12 is a flow chart of a random access method according to still yet another embodiment of the present disclosure.

The present disclosure further provides in some embodiments a random access method which, as shown in FIG. 12, includes the following steps.

Step 1201: transmitting, by a UE, a measurement report to a source base station.

To be specific, the measurement report transmitted by the UE to the source base station may include a beam-related measurement result, and the measurement result may include a measurement result of one or more beams.

Step 1202: transmitting, by the source base station, a handover request message to a target base station.

To be specific, the handover request message transmitted by the source base station to the target base station may include the beam-related measurement result.

Step 1203: selecting, by the target base station, one or more beam resources and/or one or more PRACH resources for the UE.

To be specific, upon the receipt of the handover request message from the source base station, the target base station may select the one or more beam resources and/or the one or more PRACH resources for the UE in accordance with the beam-related measurement result.

In order to prevent the handover process from being interrupted, a time for executing the handover process by the UE may be controlled in accordance with control information. The control information may be transmitted by the target base station to the source base station, e.g., it may be carried in a handover request acknowledgement message, and then transmitted by the source base station to the UE.

Step 1204: transmitting, by the target base station, information of the time for controlling the UE to execute the handover process to the source base station, and the information of the time for controlling the UE to execute the handover process may include information of a time for issuing the handover command and/or information of a time for executing the handover process.

To be specific, a message transmitted by the target base station to the source base station may carry the information of the time for controlling the UE to execute the handover process, including the information of the time for issuing the handover command and/or the information of the time for executing the handover process.

The information of the time for executing the handover process may include a time which is determined by the target base station and configured for the beam resource and/or the PRACH resource capable of being firstly transmitted by the UE, or a difference between the time which is determined by the target base station and configured for the beam resource and/or the PRACH resource capable of being firstly transmitted by the UE and a configured first time offset.

The information of the time for issuing the handover command may include the time which is determined by the target base station and configured for the beam resource and/or the PRACH resource capable of being firstly transmitted by the UE, or a difference between the time which is determined by the target base station and configured for the beam resource and/or the PRACH resource capable of being firstly transmitted by the UE and a configured second time offset.

Step 1205: transmitting, by the source base station, the handover command to the UE at a time point indicated in the information of the time for issuing the handover command in accordance with the information of the time for issuing the handover command received in Step 1204.

Step 1206: when the handover command received by the UE includes the information of the time for executing the handover process, executing the handover process at a time point indicated in the information of the time for executing the handover process.

In the embodiments of the present disclosure, in the case that a plurality of random access resources has been configured for a plurality of beams at the network side, it is able for the UE to initiate a random access process as soon as possible, thereby to reduce the time delay for the handover or state transition process.

Based on a same inventive concept, the present disclosure further provides in some embodiments a UE. A principle of the UE for solving the problem is similar to a principle of the above-mentioned random access methods in FIGS. 2-6 for solving the problem, so the implementation of the UE may refer to that of the above-mentioned random access methods, which will not be particularly defined herein.

Figure 13:
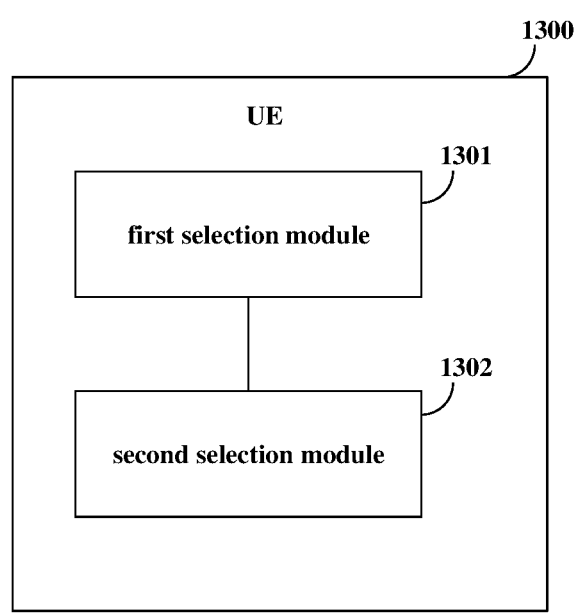
FIG. 13 is a schematic view showing a UE according to an embodiment of the present disclosure.

The present disclosure further provides in some embodiments a UE 1300 which, as shown in FIG. 13, includes a first selection module 1301 and a second selection module 1302. The first selection module 1301 is configured to select one or more beams after receiving random access resource configurations corresponding to a plurality of beams transmitted from a network side. The second selection module 1302 is configured to select a random access resource whose transmission time is a designated transmission time from available random access resources in accordance with the random access resource configuration corresponding to the one or more beams, to transmit a random access request.

In a possible embodiment of the present disclosure, the first selection module 1301 is further configured to select a firstly detected beam. The second selection module 1302 is further configured to select a random access resource with an earliest transmission time from the available random access resources in accordance with a random access resource configuration corresponding to the firstly detected beam, so as to transmit the random access request.

In a possible embodiment of the present disclosure, the first selection module 1301 is further configured to select a firstly detected beam. The second selection module 1302 is further configured to randomly select an available random access resource from a plurality of available random access resources within a first predetermined time period in accordance with a random access resource configuration corresponding to the firstly detected beam, so as to transmit the random access request. The first predetermined time period may be a time period determined in accordance with a time for the random access resource with the earliest transmission time.

In a possible embodiment of the present disclosure, the first selection module 1301 is further configured to select all of beams detected before initiating a random access process. The second selection module 1302 is further configured to select the random access resource with the earliest transmission time from all of the available random access resources in accordance with the random access resource configurations corresponding respectively to all of detected beams, to transmit the random access request.

In a possible embodiment of the present disclosure, the first selection module 1301 is further configured to select all of beams detected before initiating a random access process. The second selection module 1302 is further configured to randomly select an available random access resource from all of the available random access resources within a second predetermined time period in accordance with the random access resource configurations corresponding respectively to all of detected beams, to transmit the random access request.

The second predetermined time period may be a time period determined in accordance with a time for the random access resource with the earliest transmission time. For example, a time for transmitting a first random access resource by the UE may be t2, and the random access resources within the second predetermined time period may refer to the available random access resources within the time period of t2+T2, where a value of T2 may be agreed in a protocol, or configured by a network.

In the embodiments of the present disclosure, the UE may select, on its own initiative, the random access resource with the earlier (or earliest) transmission time from the available random access resources, and then transmit the random access request through the selected random access resource. As a result, it is able to prevent the time for initiating the random access process by the UE from being delayed, thereby to enable the UE to initiate the random access process as soon as possible, and reduce the time delay for the handover or state transition process.

Based on a same inventive concept, the present disclosure further provides in some embodiments a UE. A principle of the UE for solving the problem is similar to a principle of the above-mentioned random access method in FIG. 7 for solving the problem, so the implementation of the UE may refer to that of the above-mentioned random access method, which will not be particularly defined herein.

Figure 14:
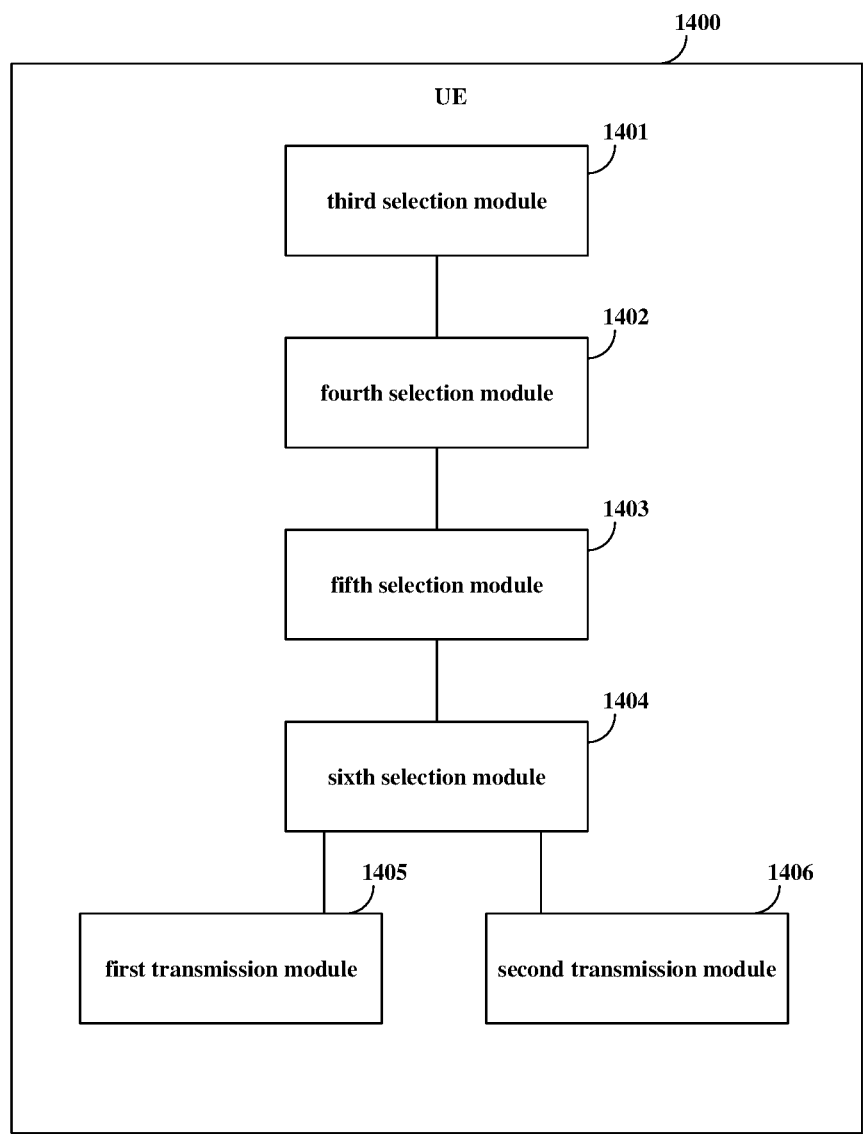
FIG. 14 is schematic view showing the UE according to another embodiment of the present disclosure.

The present disclosure provides in some embodiments a UE 1400 which, as shown in FIG. 14, includes a third selection module 1401, a fourth selection module 1402, a fifth selection module 1403, a sixth selection module 1404, a first transmission module 1405 and a second transmission module 1406. The third selection module 1401 is configured to select a firstly detected first beam. The fourth selection module 1402 is configured to select a first random access resource with an earliest transmission time from available random access resources in accordance with a random access resource configuration corresponding to the firstly detected first beam, to prepare to transmit the random access request; or randomly select an available first random access resource from a plurality of available random access resources within a third predetermined time period in accordance with the random access resource configuration corresponding to the firstly detected first beam, to prepare to transmit the random access request, and the third predetermined time period may be a time period determined in accordance with a time for a random access resource with an earliest transmission time. The fifth selection module 1403 is configured to select a second beam detected before transmitting a random access request. The sixth selection module 1404 is configured to select a second random access resource with an earliest transmission time from all of the available random access resources in accordance with the random access resource configurations corresponding respectively to the first beam and the second beam, or randomly select an available second random access resource from all of the available random access resources within a fourth predetermined time period in accordance with the random access resource configurations corresponding respectively to the first beam and the second beam, and the fourth predetermined time period may be a time period determined in accordance with the time for the random access resource with the earliest transmission time. The first transmission module 1405 is configured to, when the second random access resource is different from the first random access resource, transmit the random access request through the second random access resource. The second transmission module 1406 is configured to, when the second random access resource is the first random access resource, transmit the random access request through the second random access resource or the first random access resource.

In the embodiments of the present disclosure, the UE may select, on its own initiative, the random access resource with the earlier (or earliest) transmission time from the available random access resources, and then transmit the random access request through the selected random access resource. As a result, it is able to prevent the time for initiating the random access process by the UE from being delayed, thereby to enable the UE to initiate the random access process as soon as possible, and reduce the time delay for the handover or state transition process.

Based on a same inventive concept, the present disclosure further provides in some embodiments a target base station. A principle of the target base station for solving the problem is similar to a principle of the above-mentioned random access method in FIG. 9 for solving the problem, so the implementation of the target base station may refer to that of the above-mentioned random access method, which will not be particularly defined herein.

Figure 15:
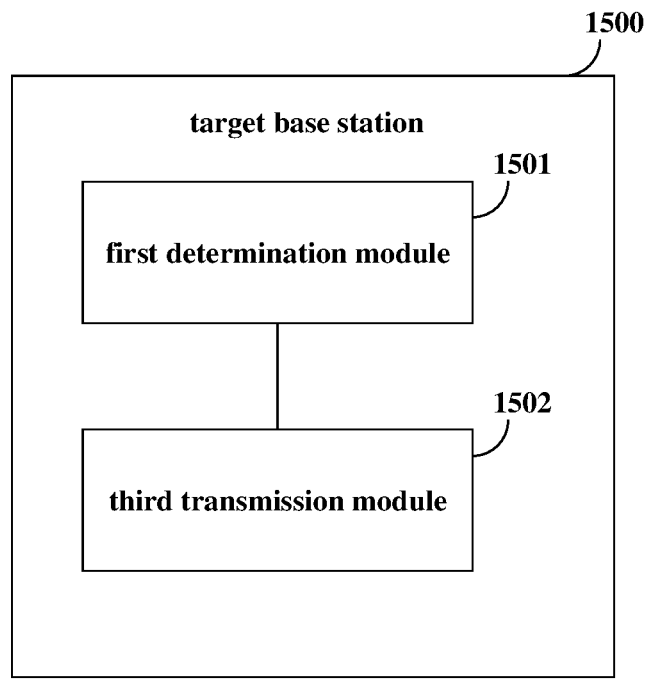
FIG. 15 is a schematic view showing a target base station according to an embodiment of the present disclosure.

The present disclosure further provides in some embodiments a target base station 1500 which, as shown in FIG. 15, includes a first determination module 1501 and a third transmission module 1502. The first determination module 1501 is configured to determine time information for controlling a UE to execute a handover process. The third transmission module 1502 is configured to transmit the time information for controlling the UE to execute the handover process to a source base station.

In a possible embodiment of the present disclosure, the time information for controlling the UE to execute the handover process may include information of a time for issuing a handover command and/or information of a time for executing the handover process.

The information of the time for executing the handover process may include a time which is determined by the target base station and configured for the beam resource and/or the PRACH resource capable of being firstly transmitted by the UE, or a difference between the time which is determined by the target base station and configured for the beam resource and/or the PRACH resource capable of being firstly transmitted by the UE and a configured first time offset.

The information of the time for issuing the handover command may include the time which is determined by the target base station and configured for the beam resource and/or the PRACH resource capable of being firstly transmitted by the UE, or a difference between the time which is determined by the target base station and configured for the beam resource and/or the PRACH resource capable of being firstly transmitted by the UE and a configured second time offset.

In the embodiment of the present disclosure, the target base station may control the UE to select the random access resource with the earliest transmission time from the available random access resources, so as to transmit the random access request. As a result, it is able to prevent the time for initiating the random access process by the UE from being delayed, thereby to enable the UE to initiate the random access process as soon as possible, and reduce the time delay for the handover or state transition process.

Based on a same inventive concept, the present disclosure further provides in some embodiments a source base station. A principle of the source base station for solving the problem is similar to a principle of the above-mentioned random access method in FIG. 10 for solving the problem, so the implementation of the source base station may refer to that of the above-mentioned random access method, which will not be particularly defined herein.

Figure 16:
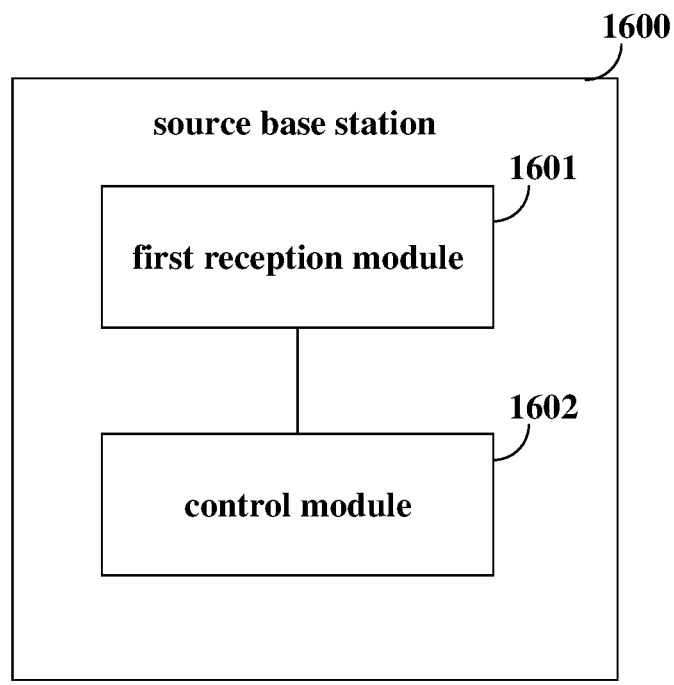
FIG. 16 is a schematic view showing a source base station according to an embodiment of the present disclosure.

The present disclosure further provides in an embodiment a source base station 1600 which, as shown in FIG. 16, includes a first reception module 1601 and a control module 1602. The first reception module 1601 is configured to receive time information for controlling a UE to execute a handover process. The control module 1602 is configured to control the UE to execute a random access process in the handover process in accordance with the time information for controlling the UE to execute the handover process.

In a possible embodiment of the present disclosure, the time information for controlling the UE to execute the handover process may include information of a time for issuing a handover command and/or information of a time for executing the handover process. The control module 1602 is further configured to transmit the information of the time for executing the handover process to the UE so that the UE executes a random access process in the handover process in accordance with the information of the time for executing the handover process, and/or transmit the handover command to the UE at a time point indicated in the information of the time for issuing the handover command.

In a possible embodiment of the present disclosure, the control module 1602 is further configured to transmit the handover command including the information of the time for executing the handover process to the UE at a time point indicated in the information of the time for issuing the handover command, so that the UE executes the random access process in the handover process in accordance with the information of the time for executing the handover process.

In a possible embodiment of the present disclosure, the source base station 1600 may further include a second determination module (not shown) configured to determine that the UE executes the random access process in the handover process in accordance with a time point indicated by the information of the time for executing the handover process.

In a possible embodiment of the present disclosure, the information of the time for executing the handover process may include a time which is determined by the target base station and configured for the beam resource and/or the PRACH resource capable of being firstly transmitted by the UE, or a difference between the time which is determined by the target base station and configured for the beam resource and/or the PRACH resource capable of being firstly transmitted by the UE and a configured first time offset.

In a possible embodiment of the present disclosure, the information of the time for issuing the handover command may include the time which is determined by the target base station and configured for the beam resource and/or the PRACH resource capable of being firstly transmitted by the UE, or a difference between the time which is determined by the target base station and configured for the beam resource and/or the PRACH resource capable of being firstly transmitted by the UE and a configured second time offset.

In the embodiment of the present disclosure, the target base station may control the UE to select the random access resource with the earliest transmission time from the available random access resources, so as to transmit the random access request. As a result, it is able to prevent the time for initiating the random access process by the UE from being delayed, thereby to enable the UE to initiate the random access process as soon as possible, and reduce the time delay for the handover or state transition process.

Based on a same inventive concept, the present disclosure further provides in some embodiments a UE. A principle of the UE for solving the problem is similar to a principle of the above-mentioned random access method in FIG. 11 for solving the problem, so the implementation of the UE may refer to that of the above-mentioned random access method, which will not be particularly defined herein.

Figure 17:
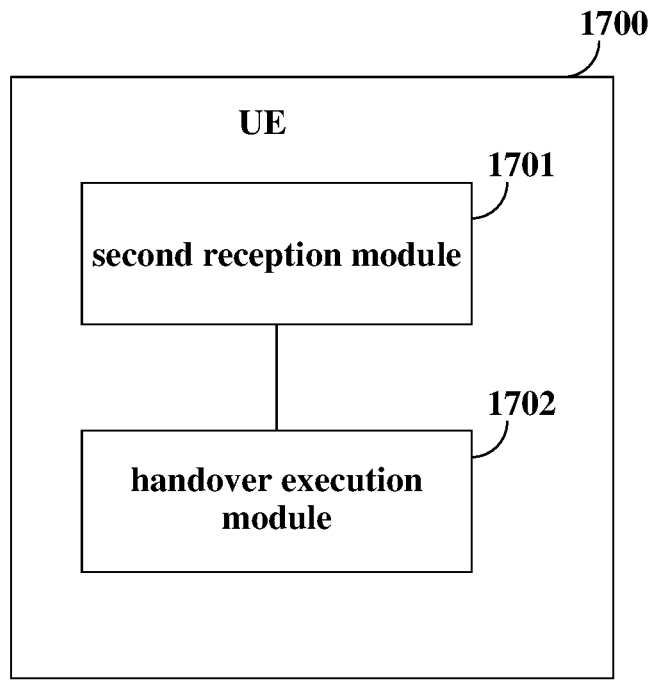
FIG. 17 is a schematic view showing the UE according to yet another embodiment of the present disclosure.

The present disclosure further provides in some embodiments a UE 1700 which, as shown in FIG. 17, includes a second reception module 1701 and a handover execution module 1702. The second reception module 1701 is configured to receive information of a time for executing a handover process. The handover execution module 1702 is configured to execute a random access process in the handover process in accordance with the information of the time for executing the handover process.

In a possible embodiment of the present disclosure, the second reception module 1701 is further configured to receive a handover command transmitted by a source base station at a time point indicated in information of a time for issuing the handover command, and the handover command may include the information of the time for executing the handover process.

In a possible embodiment of the present disclosure, the information of the time for executing the handover process may include a time which is determined by the target base station and configured for the beam resource and/or the PRACH resource capable of being firstly transmitted by the UE, or a difference between the time which is determined by the target base station and configured for the beam resource and/or the PRACH resource capable of being firstly transmitted by the UE and a configured first time offset.

In the embodiment of the present disclosure, the target base station may control the UE to select the random access resource with the earliest transmission time from the available random access resources, so as to transmit the random access request. As a result, it is able to prevent the time for initiating the random access process by the UE from being delayed, thereby to enable the UE to initiate the random access process as soon as possible, and reduce the time delay for the handover or state transition process.

Figure 18:
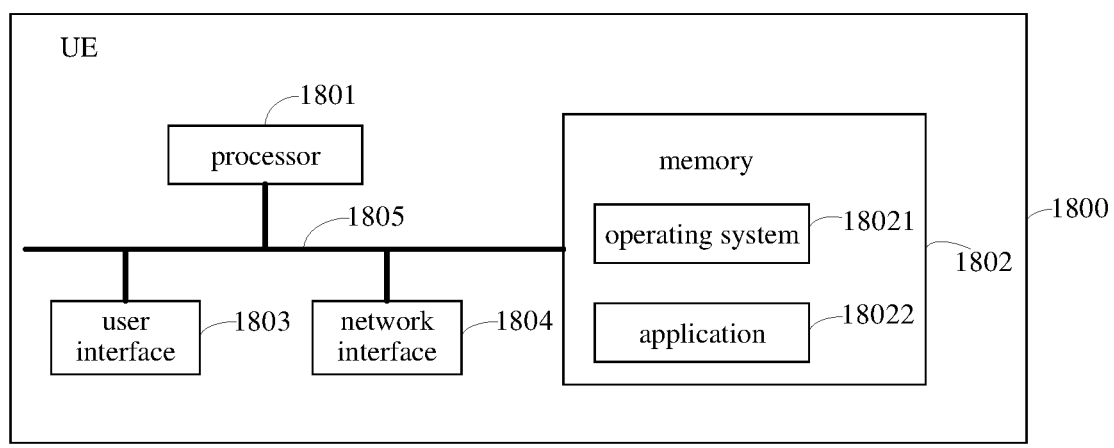
FIG. 18 is a schematic view showing the UE according to still yet another embodiment of the present disclosure.

The present disclosure further provides in an embodiment a UE 1800 which, as shown in FIG. 18, includes at least one processor 1801, a memory 1802, at least one network interface 1804, and a user interface 1803. The components of the UE 1800 may be coupled together through a bus system 1805. It should be appreciated that, the bus system 1805 is configured to achieve connection and communication among the components. Apart from a data bus, the bus system 1805 may further include a power source bus, a control bus and a state signal bus. For clarification, all these buses in FIG. 18 may be collectively called as bus system 1805.

The user interface 1803 may include a display, a keyboard or a pointing device (e.g., mouse, track ball, touch pad or touch panel).

It should be appreciated that, in the embodiment of the present disclosure, the memory 1802 may be a volatile memory, a nonvolatile memory or both. The nonvolatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM) which serves as an external high-speed cache. Illustratively but nonrestrictively, the RAM may include any one of various forms, including Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). In the embodiment of the present disclosure, the memory 1802 of the systems and the methods intends to include, but not limited to, the above-mentioned and any other appropriate memories.

In a possible embodiment of the present disclosure, the following elements may be stored in the memory 1802: an executable module or data structure, a subset or an extended set thereof, an operating system 18021 and an application 18022.

The operating system 18021 may include various system programs, e.g., a framework layer, a core library layer and a driving layer, so as to implement various basic services and process hardware-based tasks. The application 18022 may include various applications, e.g., Media Player and Browser, so as to implement various application services. The programs for implementing the above-mentioned method may be included in the application 18022.

In the embodiment of the present disclosure, through calling a program or instruction stored in the memory 1802, e.g., a program or instruction stored in the application 18022, the processor 1801 is configured to implement the above-mentioned random access method for the UE.

The above-mentioned method may be applied to, or implemented by, the processor 1801. The processor 1801 may be an Integrated Circuit (IC) having a signal processing capability. During the implementation, the steps of the above-mentioned method may be completed through an integrated logic circuit of hardware in the processor 1801 or instructions in the form of software. The processor 1801 may be a general-purpose processor, a Digital Signal Processor (DSP), an Application-Specific Integrated Circuit (ASIC), a Field Programmable Gate Array (FPGA) or another programmable logic element, a discrete gate or transistor logic element, or a discrete hardware assembly, which may be used to implement or execute the methods, steps or logic diagrams in the embodiments of the present disclosure. The general purpose processor may be a microprocessor or any conventional processor. The steps of the method in the embodiments of the present disclosure may be directly implemented by the decoding processor in the form of hardware, or a combination of hardware and software modules in the decoding processor. The software module may be located in a known storage medium such as an RAM, a flash memory, an ROM, a PROM, an EEPROM, or a register. The storage medium may be located in the memory 1802, and the processor 1801 may read information stored in the memory 1802 so as to implement the steps of the method in conjunction with hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, another electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

To be specific, the processor 1801 is configured to call the program or instruction stored in the memory 1802, so as to implement the random access method for the UE.

In a possible embodiment of the present disclosure, the processor 1801 is configured to: select one or more beams after receiving random access resource configurations corresponding to a plurality of beams transmitted from a network side; and select a random access resource whose transmission time is a designated transmission time from available random access resources in accordance with the random access resource configuration corresponding to the one or more beams, to transmit a random access request.

In a possible embodiment of the present disclosure, the processor 1801 is further configured to: select a firstly detected beam; and select a random access resource with an earliest transmission time from the available random access resources in accordance with a random access resource configuration corresponding to the firstly detected beam, so as to transmit the random access request.

In a possible embodiment of the present disclosure, the processor 1801 is further configured to: select a firstly detected beam; and randomly select an available random access resource from a plurality of available random access resources within a first predetermined time period in accordance with a random access resource configuration corresponding to the firstly detected beam, so as to transmit the random access request.

In a possible embodiment of the present disclosure, the processor 1801 is further configured to: select all of beams detected before initiating a random access process; and select the random access resource with an earliest transmission time from all of the available random access resources in accordance with the random access resource configurations corresponding respectively to all of detected beams to transmit the random access resource.

In a possible embodiment of the present disclosure, the processor 1801 is further configured to: select all of beams detected before initiating a random access process; and randomly select an available random access resource from all of the available random access resources within a second predetermined time period in accordance with the random access resource configurations corresponding respectively to all of detected beams to transmit the random access resource.

In a possible embodiment of the present disclosure, the processor 1801 is further configured to: select a firstly detected first beam; select a first random access resource with an earliest transmission time from available random access resources in accordance with a random access resource configuration corresponding to the firstly detected first beam, to prepare to transmit the random access request; or randomly select an available first random access resource from a plurality of available random access resources within a third predetermined time period in accordance with the random access resource configuration corresponding to the firstly detected first beam, to prepare to transmit the random access request; select a second beam detected before transmitting a random access request; select a second random access resource with an earliest transmission time from all of the available random access resources in accordance with the random access resource configurations corresponding respectively to the first beam and the second beam, or randomly select an available second random access resource from all of the available random access resources within a fourth predetermined time period in accordance with the random access resource configurations corresponding respectively to the first beam and the second beam; when the second random access resource is different from the first random access resource, transmit the random access request through the second random access resource; and when the second random access resource is the first random access resource, transmit the random access request through the second random access resource or the first random access resource.

In a possible embodiment of the present disclosure, the processor 1801 is further configured to receive information of a time for executing a handover process, and execute the random access process in the handover process in accordance with the information of the time for executing the handover process.

In a possible embodiment of the present disclosure, the processor 1801 is further configured to receive a handover command transmitted by a source base station at a time point indicated in information of a time for issuing the handover command, and the handover command may include the information of the time for executing the handover process.

In the embodiment of the present disclosure, the UE may select, on its own initiative, the random access resource with the earliest transmission time from the available random access resources, and then transmit the random access request through the selected random access resource. As a result, it is able to prevent the time for initiating the random access process by the UE from being delayed, thereby to enable the UE to initiate the random access process as soon as possible, and reduce the time delay for the handover or state transition process.

Figure 19:
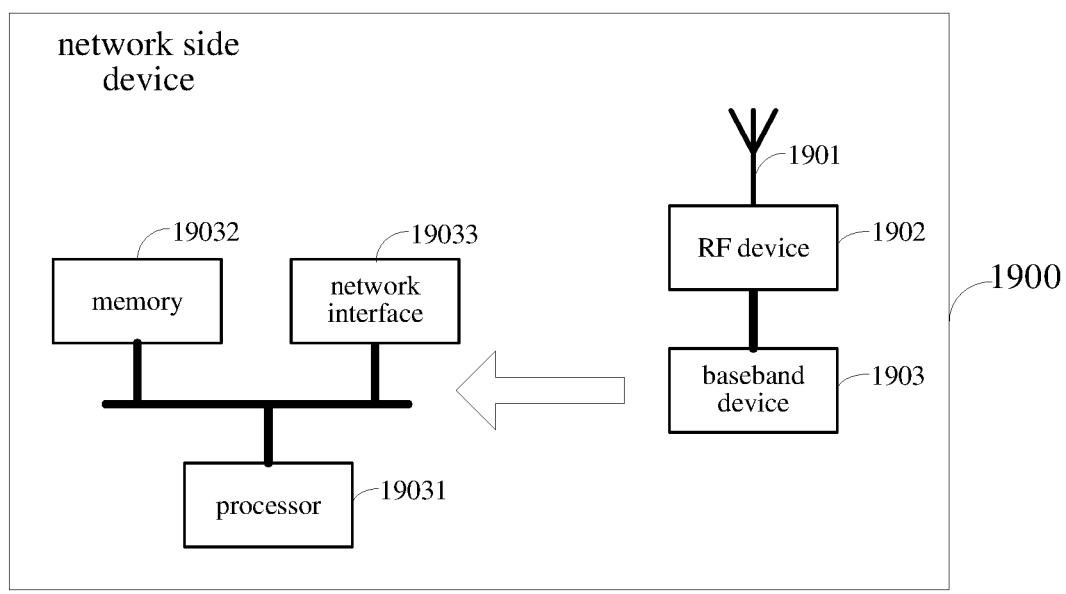
FIG. 19 is a schematic view showing a network side device according to an embodiment of the present disclosure.

The present disclosure further provides in some embodiments a network side device 1900 which, as shown in FIG. 19, includes an antenna 1901, a Radio Frequency (RF) device 1902 and a baseband device 1903. The antenna 1901 is connected to the RF device 1902. In an uplink direction, the RF device 1902 may receive information via the antenna 1901, and transmit the received information to the baseband device 1903 for the subsequent processing. In a downlink direction, the baseband device 1903 may process to-be-transmitted information, and transmit the processed information to the RF device 1902. Then, the RF device 1902 may process the received information and transmit the processed information via the antenna 1901.

A baseband processing unit may be located in the baseband device 1903, and the above-mentioned random access method for the network side device may be implemented by the baseband device 1903. The baseband device 1903 may include a processor 19031 and a memory 19032.

The baseband device 1903 may include, e.g., at least one baseband board, and a plurality of chips may be arranged on the baseband board, as shown in FIG. 19. One chip may be the processor 19031 connected to the memory 19032, so as to call a program stored in the memory 19032, thereby to implement steps of the above-mentioned random access method for the network side device.

The baseband device 1903 may further include a network interface 19033 configured to exchange information with the RF device 1302. The network interface may be a Common Public Radio Interface (CPRI).

Here, the processor may include one processor or a plurality of processing elements. For example, the processor may be a CPU, an ASIC, or one or more integrated circuits configured to implement the above-mentioned random access method for the network side device, e.g., one or more Digital Signal Processors (DSPs), or one or more FPGAs. The memory may include one storage element or a plurality of storage elements.

The memory 19032 may be a volatile memory, a nonvolatile memory or both. The nonvolatile memory may be an ROM, a PROM, an EPROM, an EEPROM or a flash memory. The volatile memory may be an RAM which serves as an external high-speed cache. Illustratively but nonrestrictively, the RAM may include any one of various forms, including SRAM, DRAM, SDRAM, DDRSDRAM, ESDRAM, SLDRAM or DRRAM. In the embodiment of the present disclosure, the memory 19032 intends to include, but not limited to, the above-mentioned and any other appropriate memories.

To be specific, the processor 19031 is configured to call the program stored in the memory 19032, so as to implement the above-mentioned random access method for the target base station or the source base station.

For example, when the network side device is the target base station, the processor 19031 is further configured to: determine time information for controlling a UE to execute a handover process; and transmit the time information for controlling the UE to execute the handover process to the source base station.

For another example, when the network side device is the source base station, the processor 19031 is further configured to: receive time information for controlling a UE to execute a handover process; and control the UE to execute a random access process in the handover process in accordance with the time information for controlling the UE to execute the handover process.

In a possible embodiment of the present disclosure, the processor 19031 is further configured to transmit information of a time for executing the handover process to the UE so that the UE executes a random access process in the handover process in accordance with the information of the time for executing the handover process, and/or transmit a handover command to the UE at a time point indicated in information of a time for issuing the handover command.

In a possible embodiment of the present disclosure, the processor 19031 is further configured to transmit the handover command including the information of the time for executing the handover process to the UE at a time point indicated in the information of a time for issuing the handover command, so that the UE executes the random access process in the handover process in accordance with the information of the time for executing the handover process.

In a possible embodiment of the present disclosure, the processor 19031 is further configured to determine that the UE execute the random access process in the handover process at a time point indicated in the information of the time for executing the handover process.

In the embodiment of the present disclosure, the network side device may control the UE to select the random access resource with the earliest transmission time from the available random access resources, so as to transmit the random access request. As a result, it is able to prevent the time for initiating the random access process by the UE from being delayed, thereby to enable the UE to initiate the random access process as soon as possible, and reduce the time delay for the handover or state transition process.

It should be appreciated that, units and steps described in the embodiments of the present disclosure may be implemented in the form of electronic hardware, or a combination of a computer software and the electronic hardware. Whether or not these functions are executed by hardware or software depends on specific applications or design constraints of the technical solution. Different methods may be adopted by a person skilled in the art with respect to the specific applications so as to achieve the described functions, without departing from the scope of the present disclosure.

It should be further appreciated that, for convenience and clarification, operation procedures of the system, device and units described hereinabove may refer to the corresponding procedures in the above method embodiments, and thus will not be particularly defined herein.

It should be further appreciated that, the device and method may be implemented in any other ways. For example, the embodiments for the apparatus are merely for illustrative purposes, and the division of the units are provided merely on the basis of their logic functions. During the actual application, the division of the units may be implemented in another manner. For example, some components or units may be combined together or integrated into another system. Alternatively, some features may be omitted or not executed. In addition, the coupling connection, direct coupling connection or communication connection between the modules or units shown or discussed herein may be implemented via interfaces, and the indirect coupling connection or communication connection between the modules or units may be implemented in an electrical or mechanical form or in any other form.

The units may be, or may not be, physically separated from each other. The shown units may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, essential or partial, or parts of the technical solutions of the present disclosure contributing to the related art, may appear in the form of software products, which may be stored in a storage medium and include several instructions so as to enable computer equipment (e.g., a personal computer, a server or network equipment) to execute all or parts of the steps of the method according to the embodiments of the present disclosure. The storage medium includes one of various mediums capable of storing therein program codes, e.g., a Universal Serial Bus (USB) flash disk, a mobile Hard Disk (HD), an ROM, an RAM, a magnetic disk or an optical disk.

The above embodiments are for illustrative purposes only, but the present disclosure is not limited thereto. A person skilled in the art may make further modifications and improvements without departing from the spirit of the present disclosure, and these modifications and improvements shall also fall within the scope of the present disclosure. A protection scope of the present disclosure is defined by claims.

What is claimed is:

1. A random access method for a User Equipment (UE), comprising:
   selecting one or more beams after receiving random access resource configurations corresponding to a plurality of beams transmitted from a network side; and
   selecting a random access resource whose transmission time is a designated transmission time from available random access resources in accordance with a random access resource configuration of the random access resource configurations corresponding to the one or more beams, to transmit a random access request, wherein the available random access resources comprise a random access resource with an earlier transmission time and a random access resource with an earliest transmission time,
   wherein the random access resource whose transmission time is the designated transmission time is a randomly selected one of the available random access resources within a time period determined in accordance with a time for the random access resource with the earliest transmission time.

2. The random access method according to claim 1, wherein
   the selecting the one or more beams comprises: selecting a firstly detected beam; and
   accordingly, the selecting the random access resource whose transmission time is the designated transmission time from the available random access resources in accordance with the random access resource configuration corresponding to the one or more beams to transmit the random access request comprises: selecting a random access resource with an earliest transmission time from the available random access resources in accordance with the random access resource configuration corresponding to the firstly detected beam, to transmit the random access request.

3. The random access method according to claim 1, wherein
   the selecting the one or more beams comprises: selecting a firstly detected beam; and
   accordingly, the selecting the random access resource whose transmission time is the designated transmission time from the available random access resources in accordance with the random access resource configuration corresponding to the one or more beams to transmit the random access request comprises: randomly selecting an available random access resource from a plurality of available random access resources within a predetermined time period in accordance with the random access resource configuration corresponding to the firstly detected beam, to transmit the random access request, wherein the predetermined time period is a time period determined in accordance with a time for the random access resource with the earliest transmission time.

4. The random access method according to claim 1, wherein
   the selecting the one or more beams comprises: selecting all of beams detected before initiating a random access process; and
   accordingly, the selecting the random access resource whose transmission time is the designated transmission time from the available random access resources in accordance with the random access resource configuration corresponding to the one or more beams to transmit the random access request comprises: selecting a random access resource with an earliest transmission time from all of the available random access resources in accordance with the random access resource configurations corresponding respectively to all of detected beams, to transmit the random access request.

5. The random access method according to claim 1, wherein
   the selecting the one or more beams comprises: selecting all of beams detected before initiating a random access process; and
   accordingly, the selecting the random access resource whose transmission time is the designated transmission time from the available random access resources in accordance with the random access resource configuration corresponding to the one or more beams to transmit the random access request comprises: randomly selecting an available random access resource from all of the available random access resources within a predetermined time period in accordance with the random access resource configurations corresponding respectively to all of detected beams, to transmit the random access request, wherein the predetermined time period is a time period determined in accordance with a time for a random access resource with an earliest transmission time.

6. The random access method according to claim 1, wherein the random access resource whose transmission time is the designated transmission time is a random access resource with an earliest transmission time, or is any one of the available random access resources within a time period determined in accordance with a time for the random access resource with the earliest transmission time.

7. A random access method for a UE, comprising:
   selecting a firstly detected first beam;
   selecting a first random access resource with an earliest transmission time from available random access resources in accordance with a random access resource configuration corresponding to the firstly detected first beam, to prepare to transmit a random access request; or randomly selecting an available first random access resource from a plurality of available random access resources within a first predetermined time period in accordance with the random access resource configuration corresponding to the firstly detected first beam, to prepare to transmit the random access request, wherein the first predetermined time period is a time period determined in accordance with a time for the random access resource with the earliest transmission time that is determined in accordance with the random access resource configuration corresponding to the firstly detected first beam;
   selecting a second beam detected before transmitting a random access request;
   selecting a second random access resource with an earliest transmission time from all of the available random access resources in accordance with the random access resource configuration corresponding to the first beam and a random access resource configuration corresponding to the second beam; or randomly selecting an available second random access resource from all of the available random access resources within a second predetermined time period in accordance with the random access resource configurations corresponding respectively to the first beam and the second beam, wherein the second predetermined time period is a time period determined in accordance with the time for the random access resource with the earliest transmission time that is determined in accordance with the random access resource configurations corresponding respectively to the first beam and the second beam;

when the second random access resource is different from the first random access resource, transmitting the random access request through the second random access resource; and when the second random access resource is the first random access resource, transmitting the random access request through the second random access resource or the first random access resource.

8. A UE, comprising a memory, a processor, and a computer program stored in the memory and executed by the processor, wherein the processor is configured to execute the computer program to:

select one or more beams after receiving random access resource configurations corresponding to a plurality of beams transmitted from a network side; and select a random access resource whose transmission time is a designated transmission time from available random access resources in accordance with a random access resource configuration of the random access resource configurations corresponding to the one or more beams, to transmit a random access request, wherein the available random access resources comprise a random access resource with an earlier transmission time and a random access resource with an earliest transmission time, wherein the random access resource whose transmission time is the designated transmission time is a randomly selected one of the available random access resources within a time period determined in accordance with a time for the random access resource with the earliest transmission time.

9. The UE according to claim 8, wherein the random access resource whose transmission time is the designated transmission time is a random access resource with an earliest transmission time, or is any one of the available random access resources within a time period determined in accordance with a time for the random access resource with the earliest transmission time.

10. The UE according to claim 8, wherein the processor is further configured to execute the computer program to:
select a firstly detected beam; and
select a random access resource with an earliest transmission time from the available random access resources in accordance with the random access resource configuration corresponding to the firstly detected beam, to transmit the random access request.

11. The UE according to claim 8, wherein the processor is further configured to execute the computer program to:
select a firstly detected beam; and
randomly select an available random access resource from a plurality of available random access resources within a predetermined time period in accordance with the random access resource configuration corresponding to the firstly detected beam, to transmit the random access request, wherein the predetermined time period is a time period determined in accordance with a time for the random access resource with the earliest transmission time.

12. The UE according to claim 8, wherein the processor is further configured to execute the computer program to:
select all of beams detected before initiating a random access process; and
select a random access resource with an earliest transmission time from all of the available random access resources in accordance with the random access resource configurations corresponding respectively to all of detected beams, to transmit the random access request.

13. The UE according to claim 8, wherein the processor is further configured to execute the computer program to:
select all of beams detected before initiating a random access process; and
randomly select an available random access resource from all of the available random access resources within a predetermined time period in accordance with the random access resource configurations corresponding respectively to all of detected beams, to transmit the random access request, wherein the predetermined time period is a time period determined in accordance with a time for a random access resource with an earliest transmission time.

14. A UE, comprising a memory, a processor, and a computer program stored in the memory and executed by the processor, wherein the processor is configured to execute the computer program to implement the random access method according to claim 7.

15. A non-transitory computer-readable storage medium storing therein a computer program, wherein the computer program is executed by a processor, to implement the random access method according to claim 1.

16. The non-transitory computer-readable storage medium according to claim 15, wherein the computer program is further executed by the processor to:
select a firstly detected beam; and
select a random access resource with an earliest transmission time from the available random access resources in accordance with the random access resource configuration corresponding to the firstly detected beam, to transmit the random access request.

17. The non-transitory computer-readable storage medium according to claim 15, wherein the computer program is further executed by the processor to:
select a firstly detected beam; and
randomly select an available random access resource from a plurality of available random access resources within a predetermined time period in accordance with the random access resource configuration corresponding to the firstly detected beam, to transmit the random access request, wherein the predetermined time period is a time period determined in accordance with a time for the random access resource with the earliest transmission time.

18. The non-transitory computer-readable storage medium according to claim 15, wherein the computer program is further executed by the processor to:
select all of beams detected before initiating a random access process; and
select a random access resource with an earliest transmission time from all of the available random access resources in accordance with the random access resource configurations corresponding respectively to all of detected beams, to transmit the random access request.

19. The non-transitory computer-readable storage medium according to claim 15, wherein the computer program is further executed by the processor to:

select all of beams detected before initiating a random access process; and randomly select an available random access resource from all of the available random access resources within a predetermined time period in accordance with the random access resource configurations corresponding respectively to all of detected beams, to transmit the random access request, wherein the predetermined time period is a time period determined in accordance with a time for a random access resource with an earliest transmission time.

20. A non-transitory computer-readable storage medium storing therein a computer program, wherein the computer program is executed by a processor, to implement the random access method according to claim 7.

* * * * *